(12) United States Patent
Said et al.

(10) Patent No.: US 7,294,454 B1
(45) Date of Patent: Nov. 13, 2007

(54) WAVEGUIDE FABRICATION METHODS AND DEVICES

(75) Inventors: Ali A. Said, Ann Arbor, MI (US); Mark A. Dugan, Ann Arbor, MI (US); Thomas Sosnowski, Pinckney, MI (US); Philippe Bado, Ann Arbor, MI (US)

(73) Assignee: Translume, Inc., Ann Arbor, MI (US)

( * ) Notice: Subject to any disclaimer, the term of this patent is extended or adjusted under 35 U.S.C. 154(b) by 379 days.

(21) Appl. No.: 10/676,972

(22) Filed: Sep. 30, 2003

Related U.S. Application Data (60) Provisional application No. 60/414,765, filed on Sep. 30, 2002.

(51) Int. Cl.
*G11C 13/04* (2006.01)
(52) U.S. Cl. .................. 430/321; 430/320; 219/121.6; 219/121.85; 219/121.67; 219/121.89
(58) Field of Classification Search ...................... None
See application file for complete search history.

(56) References Cited

U.S. PATENT DOCUMENTS

| | | | |
|---|---|---|---|
| 5,745,630 | A | 4/1998 | Vawter et al. |
| 6,555,781 | B2 * | 4/2003 | Ngoi et al. ............. 219/121.67 |
| 6,628,877 | B2 | 9/2003 | Dugan et al. |
| 6,768,850 | B2 * | 7/2004 | Dugan et al. ............... 385/124 |
| 6,992,026 | B2 * | 1/2006 | Fukuyo et al. .............. 438/797 |
| 2001/0021293 | A1 | 9/2001 | Kouta et al. |
| 2002/0085824 | A1 | 7/2002 | Dugan et al. |
| 2003/0035640 | A1 | 2/2003 | Dugan et al. |
| 2003/0099452 | A1 | 5/2003 | Borrelli et al. |
| 2004/0126057 | A1 | 7/2004 | Yoo |

FOREIGN PATENT DOCUMENTS

| | | | |
|---|---|---|---|
| EP | 1338371 | * | 8/2003 |
| WO | 99/55487 | * | 11/1999 |
| WO | 01/09899 | * | 2/2001 |

(Continued)

OTHER PUBLICATIONS

Hirao et al. "Writing waveguides and gratings in silica and related materials by a femtosecond laser", J. Noncryst. Sol. vol. 239 pp. 91-95 (1998).*

(Continued)

*Primary Examiner*—Martin Angebranndt
(74) *Attorney, Agent, or Firm*—Lempia Forman LLC (57) ABSTRACT

A method of writing a waveguide using an ultrashort laser beam is disclosed. The laser beam is directed to a substrate in transverse relation to a waveguide propagation axis to generate an ultrashort laser pulse focus in the substrate. A refractive index is modified in an affected region in the substrate along the waveguide propagation axis via the ultrashort laser pulse focus, and the ultrashort laser pulse focus is moved in a direction other than the waveguide propagation axis to generate a widened affected region along the waveguide propagation axis. The widened affected region has a cross-sectional profile capable of supporting a fundamental mode of a signal having a telecommunications infrared (TIR) wavelength, while the affected region has a cross-sectional profile incapable of supporting the fundamental mode of the signal having the TIR wavelength.

34 Claims, 4 Drawing Sheets

FOREIGN PATENT DOCUMENTS

WO 02/22301 * 3/2002

OTHER PUBLICATIONS

Davis et al., Writing waveguides in glass with a femtosecond laser, Opt. Lett., vol. 21(21) pp. 1729-1731 (Nov. 1996).*

Poumellec, "Femtosecond laser irradiation stress induced in pure silica," *Optics Express*, 11(9):1070-1079 (2003).

Schaffer, et al., "Micromachining bulk glass by use of femtosecond laser pulses with nanojoule energy," *Optics Letters* 26(2):93-95 (2001).

* cited by examiner

WAVEGUIDE FABRICATION METHODS AND DEVICES

CROSS-REFERENCE TO RELATED APPLICATIONS

This application claims the benefit of U.S. Provisional Application No. 60/414,765, filed Sep. 30, 2002, which is incorporated herein by reference.

GENERAL FIELD

The disclosure relates generally to optical waveguides and, more specifically, to a method of altering physical or optical characteristics of an optical medium using an ultrashort laser to fabricate an optical waveguide in the bulk of the optical medium.

BACKGROUND

Ultrashort laser pulses have been used to modify the refractive index of transparent materials, such as glasses of various compositions, for the trimming of optical waveguides and fabrication of fiber-based optical devices, such as fiber Bragg gratings. Laser-based trimming techniques have been utilized in connection with planar waveguides formed via well-known photolithography, diffusion, and etching techniques. Such techniques are useful for modifying the refractive index profile of the pre-existing, planar waveguide. For example, the ultrashort laser pulses are typically applied to modify the optical path length of the waveguide.

Pulse energy, pulse width, scan rate, and repetition frequency have been identified as process parameters relevant to determining the nature and extent of the trimming operation. For example, the shape of a pre-existing waveguide has been modified via application of ultrashort waveguide pulses to taper a portion thereof. Other ways in which the trimming technique has been used to locally alter the physical structure of a pre-existing waveguide include adjusting the polarization behavior of the waveguide to create approximately symmetric regions of index change. Such techniques may involve writing index changes within the pre-existing waveguide that are slightly laterally displaced from each other. See U.S. Patent Application Pub. No. 20020085824 A1, published Jul. 4, 2002, and entitled "Index trimming of optical waveguide devices using ultrashort laser pulses for arbitrary control of signal amplitude, phase, and polarization."

The above-identified, prior techniques have generally been directed to the modification of pre-existing waveguides that are already capable of guiding light of a desired wavelength. Moreover, the waveguides have been typically fabricated using non-laser-based methods, such as photolithography. These methods are fairly limited to the surface of the substrate, in turn typically limiting the functionality of devices fabricated thereby to the two-dimensional interactions in that planar surface.

Another complication involves the wavelength of the optical signal. Wavelength can be a limiting factor for any waveguide—whether at the surface or in the bulk—because certain waveguides that guide light at one wavelength may be incapable of guiding light at longer wavelengths. As the telecommunications industry migrates to systems based on optical signals having wavelengths at or near 1.55 microns, the optical waveguides and other devices that were effective in different regimes, such as 800 nm, may no longer provide suitable performance or, in some cases, may be incapable of guiding light at all.

SUMMARY OF THE INVENTION

In accordance with an embodiment, provided is a method of writing a waveguide. The refractive index is modified in an affected region in the substrate along the waveguide propagation axis via the ultrashort laser pulse focus, and the ultrashort laser pulse focus is moved in a direction other than the waveguide propagation axis to generate a widened affected region along the waveguide propagation axis. The affected region has a cross-sectional profile incapable of supporting the fundamental mode of a signal having a telecommunications infrared (TIR) wavelength, but the widened affected region has a cross-sectional profile capable of supporting the fundamental mode of the signal.

In accordance with another embodiment, provided is a method of writing a waveguide including the steps of modifying a refractive index in an affected region in a substrate along a waveguide propagation axis via an ultrashort laser pulse focus, and scanning an ultrashort laser pulse focus in a direction other than the waveguide propagation axis to generate a widened affected region along the waveguide propagation axis. The scanning step is performed during performance of the modifying step.

In still another embodiment, a method of writing a waveguide is provided. A refractive index is modified in an affected region in a substrate along a waveguide propagation axis via an ultrashort laser pulse focus, and the ultrashort laser pulse focus is moved in a direction other than the waveguide propagation axis to generate a widened affected region along the waveguide propagation axis. The ultrashort laser pulse beam has a polarization in a direction parallel to the waveguide propagation axis.

In another embodiment, an optical waveguide device is provided and disposed in a substrate along a waveguide propagation axis. A plurality of adjacent waveguide portions are disposed along the waveguide propagation axis, each waveguide portion having a cross-sectional refractive index profile incapable of supporting a fundamental mode of a signal having a telecommunications infrared (TIR) wavelength. The plurality of adjacent waveguide portions have a collective cross-sectional refractive index profile capable of supporting a fundamental mode of the signal having the telecommunications infrared (TIR) wavelength.

Further aspects and advantages may become apparent to those skilled in the art from a review of the following detailed description, taken in conjunction with the drawings. While the optical devices and fabrication methods are susceptible of embodiments in various forms, the description hereafter includes specific embodiments with the understanding that the disclosure is illustrative, and is not intended to limit the invention to the specific embodiments described herein.

DETAILED DESCRIPTION OF EMBODIMENTS

Described herein are methods of fabricating waveguides defined by refractive index profiles having sizes, shapes and other characteristics suitable for the optical propagation of certain signals of interest. The waveguide fabrication methods described herein create the refractive index profile via the application of ultrashort laser pulses to the transparent material or medium in which the waveguide is formed. Using one or more beam foci, the waveguide formed via the methods described herein has a shaped refractive index profile suitable for propagation of optical signals in a number of different wavelength regimes.

The disclosed fabrication methods may be described as direct-writing techniques where an ultrashort laser pulse focus of a writing beam is moved in two or three dimensions rather than the single dimension defining the waveguide propagation axis, i.e., the axis running along the length of the waveguide. During such non-axial movement, the physical properties of the writing beam or the optical medium may either be maintained (i.e., held constant) or varied to produce other waveguide characteristics. The resulting refractive index profile may be tailored and, consequently, not limited to the initial geometry of the affected volume or voxel (i.e., the region in which the laser beam is of sufficiently high intensity to modify the refractive index of the optical medium) associated with the writing beam.

Generally speaking, relative motion in the non-axial direction(s) may be done sequentially or simultaneously, by either moving the writing beam(s) or by moving the sample. Such writing techniques may be applied to obtain a desired refractive index shape of regions or volumes of modified refractive index that are contiguous, discrete, or some combination thereof. In this manner, an index profile is generated for optimal propagation of light at a desired wavelength with a desired output mode profile. A contiguous refractive index profile should be understood to include both (1) profiles are written by continuous deflection of the laser pulse focus, and (2) profiles that are written discontinuously but that result in index profiles that are contiguous or overlapping.

The disclosed methods may be used to fabricate a waveguide having two or more adjacent affected regions within a substrate or medium where each region has an altered or modified refractive index. Each affected region has a cross-sectional profile with dimensions insufficient to propagate a signal of a desired wavelength, such as a wavelength useful in the telecommunications industry. The regions are disposed or written in the substrate in either a proximate or contiguous manner, or both, such that the signal is not confined separately in any one of the affected regions. The signal instead propagates in a mode that overlaps and includes all of the affected regions, such that, collectively, the affected regions constitute a single widened affected region, as will be explained further below.

The waveguides fabricated by the methods described herein may, but need not be, formed in the bulk of an optical medium or substrate, e.g., glass or fused silica, such that the waveguides are characterized as in-bulk waveguides. The waveguides may still be formed at or near a surface of an optical substrate, such as with a planar waveguide, or alternatively within the bulk of a single or multi-layer substrate.

The optical characteristic "refractive index" is used herein to refer to the effective index of refraction experienced by a signal propagating through the waveguide structure. The transverse shape or mode profile of the signal extends into the optical medium beyond the transverse dimensions of the waveguide, a region referred to as the evanescent region. The effective index of refraction, therefore, represents the local index of refraction variation over the mode profile of a signal. For a single mode waveguide, the signal profile associated with the effective index of refraction is that of the fundamental mode. In a multimode waveguide an effective index of refraction can be associated with all waveguide modes activated by the propagating signal. The effective index of refraction is, therefore, also dependent on properties of the signal, such as wavelength. In fact, the effective index of refraction is used to define waveguide dispersion for a given mode of a propagating signal. Herein the refractive index, or effective index of refraction of a signal, will represent that of the fundamental mode in a single mode waveguide or the net effective index of refraction of all active modes in a multimode waveguide.

In one embodiment, the described methods are directed toward the fabrication of waveguide devices that propagate signals of standard telecommunications wavelengths. Of interest are telecommunications infrared wavelengths, such as those above one micron, where low signal loss fiber communications typically occur. This wavelength range will be referenced herein as the TIR (telecommunications infrared) band. A device fabricated for operation with a signal having a TIR wavelength shall be understood to operate in the TIR band, which may include one or more optical communication windows, such as those centered at 1310 nm and 1550 nm, where low loss transmission occurs with low chromatic dispersion. It should be noted that a limited number of optical communication networks have utilized signals having wavelengths near 850 nm. Such wavelengths, however, are not to be considered within the TIR band because operation at such wavelengths has problematically encountered higher losses and excessive chromatic dispersion.

The embodiments described hereinbelow take advantage of the direct-write capability of ultrashort pulsed lasers. Ultrashort laser pulses are herein defined to include laser pulses below 1 picosecond in duration, and may further include sub-100 femtosecond laser pulses. Lasers suitable for generating ultrashort pulses are generally available from a number of companies and other sources, including Coherent, Inc. (Santa Clara, Calif.) under the trade name "RegA" and Spectra Physics (Mountain View, Calif.) under the trade name "Tsunami." Such ultrashort pulsed lasers can typically achieve pulse widths of less than 100 femtoseconds. Direct-writing within an optical material may be achieved with pulse energies of nano-Joules to several micro-Joules depending on the pulse widths as well as focusing optics.

Further details regarding the use of ultrashort laser pulses to modify the refractive index may be found in the U.S. patent application entitled "Method of Index Trimming a Waveguide and Apparatus Formed of the Same" and having Ser. No. 09/930,929, the specification of which is hereby incorporated by reference.

Direct-write waveguide fabrication is performed using a beam of ultrashort laser pulses. As discussed, waveguide fabrication can occur in any portion of a transparent medium. When laser pulses are focused, the focusing depth or Rayleigh range region is longer than the spot size diameter. The focusing depth or confocal beam parameter is given by $Z_0 = n\pi w_0^2/\lambda$, where $\lambda$ is the wavelength of the laser light, and $w_0$ is the beam radius. Using appropriate focusing geometry, the ultrashort pulses can be focused in the bulk of a transparent medium, such as glass, to establish a desired beam waist diameter.

But the focusing depth, or three-dimensional region of refractive index modification, will be larger. For example, in glass, if the beam radius at focus is one micron, then the focusing depth will be about 6 micron for a wavelength of 0.8 microns. As a result, the cross-section of the affected region of refractive index modification (or cross-sectional refractive index profile) may have approximately a 6 to 1 ellipticity. That is, when focused to a spot, such ultrashort laser beams have an iso-intensity distribution that is shaped like an ellipsoid. A waveguide manufactured with this type of focusing setup will have an elliptical cross-section. Experimental data has confirmed this, as shown in the cross-sectional dimensions of one waveguide: 1.5×9.0 microns (see FIG. 1). Other effects such as spherical aberrations and nonlinearities inside the glass can also affect the shape of the laser-induced index change of the material. It should be noted that dimensions specified herein are measured via the full-width, half-maximum convention well known to those skilled in the art.

This inherent ellipticity, however, would complicate the writing of waveguides for certain applications in a transverse manner, where the ultrashort laser beam is directed to the substrate in transverse relation to a waveguide propagation axis. Given an index change of $5 \times 10^{-3}$ (a typical value in fused silica), the waveguiding properties of these small, elliptical cross-section waveguides are too weak for many applications of interest. Further, the elliptical shape results in signal propagation that is dependent upon signal polarization.

Certain embodiments of the fabrication method disclosed herein provide for fabricating waveguides having an enlarged cross-section to, in turn, provide waveguiding for the signals of interest. Further, creation of symmetrical cross-sections reduces or eliminates polarization dependence in signal propagation.

Figure 1:
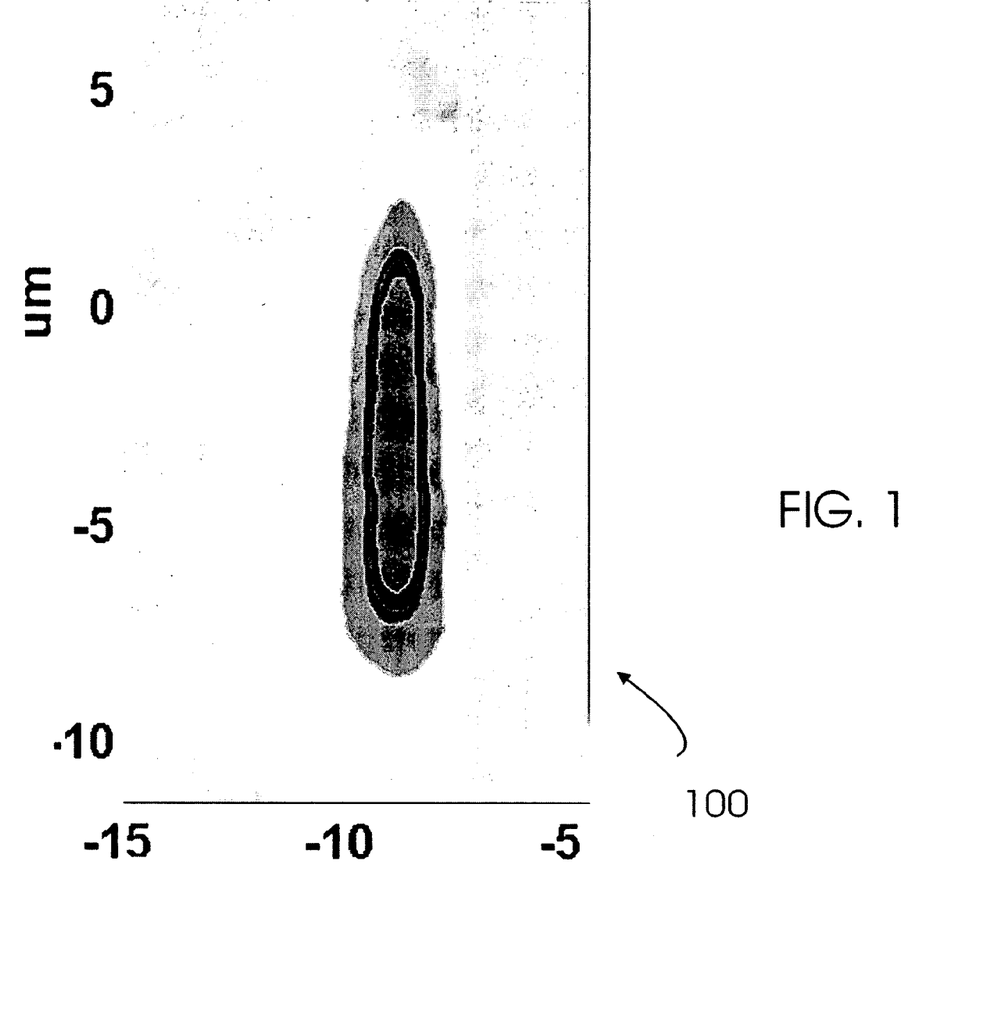
FIG. 1 is a graphical, cross-sectional representation of the modification of the refractive index profile of an optical medium after a single ultrashort laser pulse beam has been transversely applied to the optical medium in a single pass.

FIG. 1 shows the cross-sectional refractive index profile of a waveguide 100 written in a bulk glass sample (or substrate) transversely. More particularly, the graph depicts the shape of the waveguide 100 in an affected region of refractive index modification within the substrate in spatial dimensions (microns) as well as via the magnitude of refractive index modification (shading). A transverse writing technique may be described as moving the ultrashort laser pulse focus through the sample in a direction that is orthogonal to the direction of the ultrashort laser beam. Writing transversely may also be described in relation to an axis of the waveguide to be written, or waveguide propagation axis. Transverse writing involves directing the ultrashort laser beam to the substrate in transverse relation to the waveguide propagation axis. The ultrashort laser pulse focus is then moved via relative motion of the substrate with respect to the laser pulse beam along the waveguide propagation axis.

The waveguide 100 was written with an ultrashort laser beam at a wavelength of 800 nm with 100 fs pulses at a repetition rate of 250 kHz and an average power of approximately 25 mW. As described above, the affected region of the waveguide 100 has an elliptically-shaped cross-sectional profile, which may not be suitable for propagation of signals at certain wavelengths, such as a TIR wavelength. That is, the width of the refractive index profile may not be large enough to guide light at longer wavelengths and the waveguide may also exhibit strong polarization effects.

With certain embodiments of the fabrication methods described herein, one can tailor the shape and size of the region having a modified refractive index to control the optical properties of the waveguide, such as guiding strength, cutoff wavelength, polarization dependence, scattering losses, and leakiness. These fabrication methods are generally referred to herein as "painting techniques" and the tailored region having a modified refractive index is generally referred to as a widened affected region.

Figure 2A:
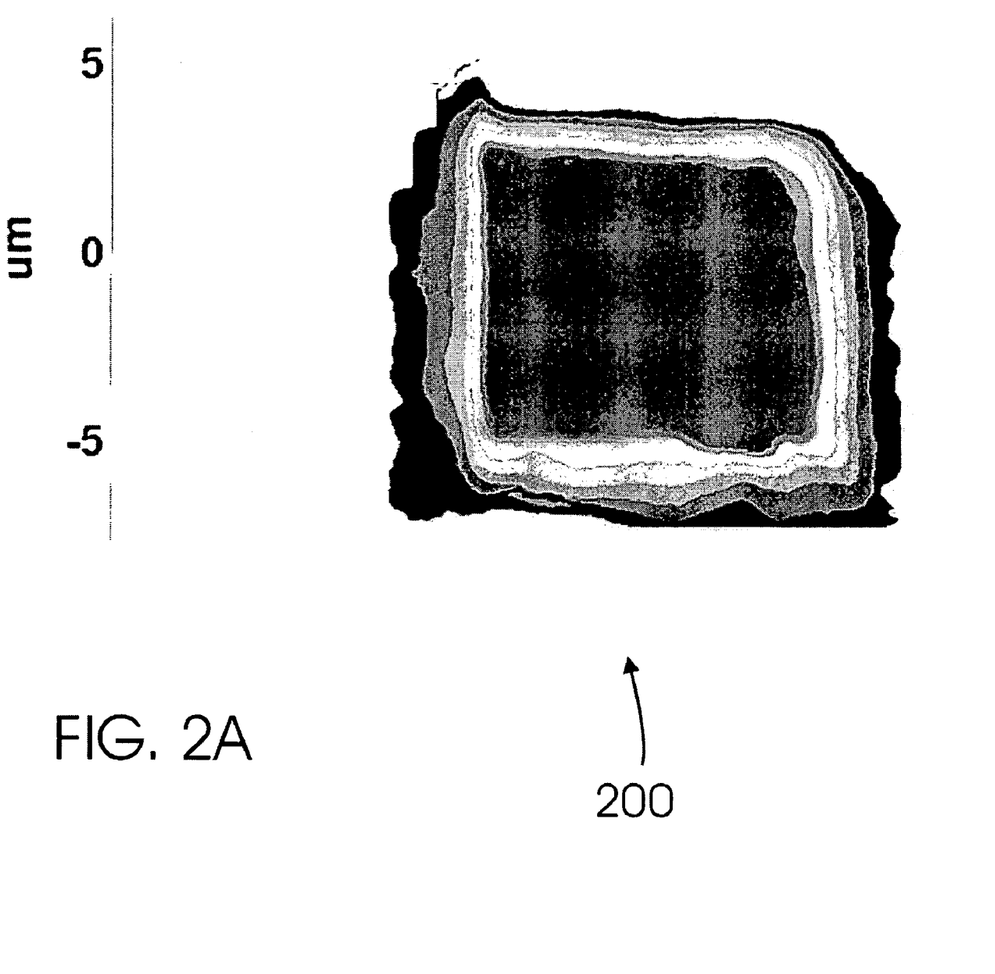
FIGS. 2A and 2B are graphical, cross-sectional representations of the modification of the refractive index profile of an optical medium after an ultrashort laser pulse beam has been transversely applied to the optical medium in accordance with one or more of the waveguide fabrication techniques disclosed herein.
Figure 2B:
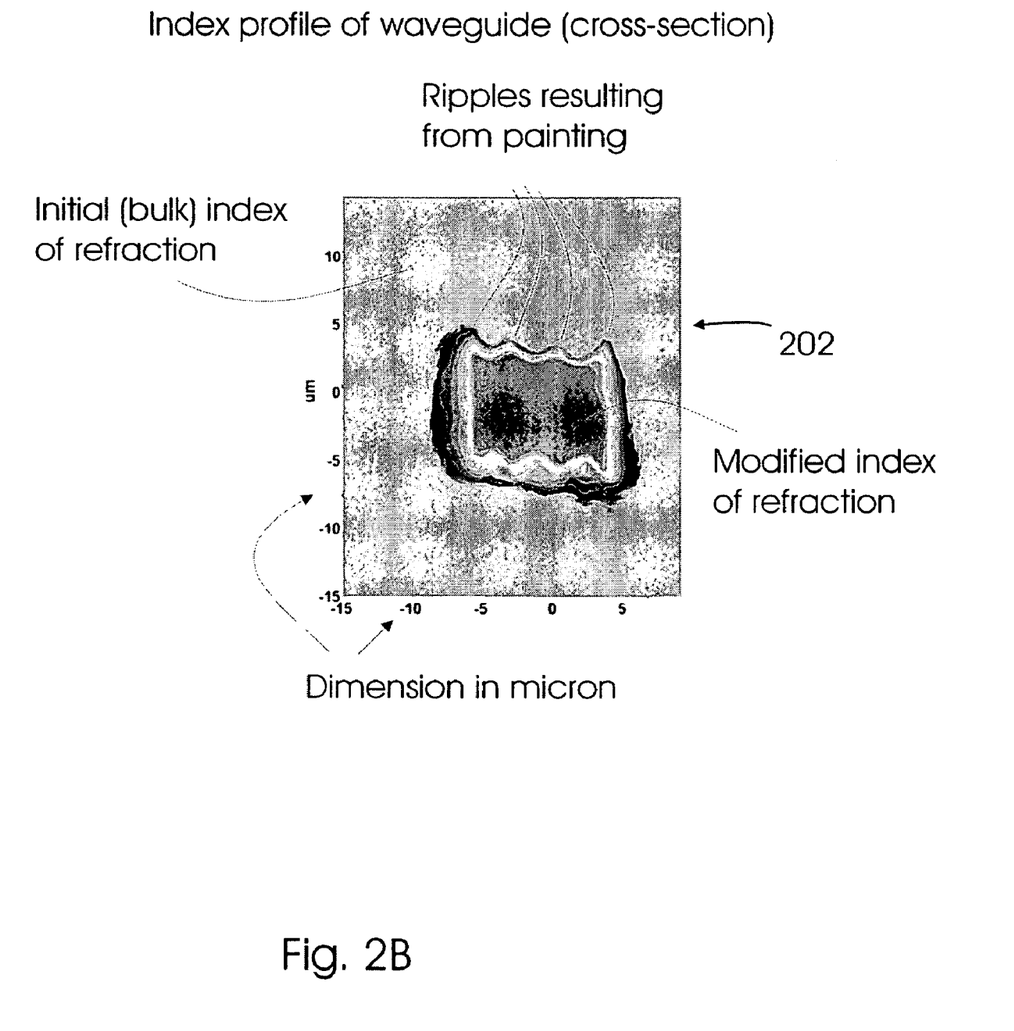

FIGS. 2A and 2B show the refractive index profiles of the widened affected regions of waveguides 200 and 202 written in bulk glass samples transversely utilizing exemplary painting techniques constituting two embodiments of the improved fabrication method described herein. The waveguides 200 and 202 were written using a skip-and-scan embodiment of the disclosed method having 13 separate, distinct and adjacent passes of the laser pulse beam (or paths of the ultrashort laser pulse focus) that were sequentially performed, where each pass includes a four-times over retrace to saturate the index change within the region affected by the pass. The number of passes may range up to twenty, or more, if a large rectangular cross-sectional profile is desired. Such cross-sectional profiles may be useful in certain multimode interference devices. Scanning sequentially involves a pattern of scanning adjacent paths to generate a number of adjacent affected regions sequentially, and is only one approach to painting the profile. A sequential scanning pattern may not be suitable for certain devices—e.g., a Y coupler may require a different scanning pattern (e.g., alternating scans such that adjacent regions or paths are not scanned sequentially to the extent possible) than an evanescent coupler. Generally speaking, the scanning pattern may be relevant because one scanning pass may have an effect on an adjacent or contiguous region. Whether such adjacent or contiguous region has already been scanned has been shown to affect the characteristics of the resulting waveguide.

The skip-and-scan approach used to fabricate the waveguides 200 and 202 incorporated a number of scans with a certain scan separation designed to generate a square cross-section and a uniform index profile. The paths may be separated by about 0.5 microns (center-to-center distance between adjacent paths) to avoid too much modulation of the refractive index profile. Smaller spacing may provide smoother profiles, but would of course require more passes to obtain the same square cross-section. In general, the scan separation is chosen to avoid asymmetry (but, in some cases, asymmetry may be desirable).

The waveguide 200 has a cross-sectional profile with smoother edges than the waveguide 202, which has a ripple effect that may result from a skip-and-scan embodiment of the painting technique wherein the center-to-center distance of the scans or paths is greater than the size of the affected region resulting from each scan. Further information regarding the skip-and-scan and other fabrication techniques will be provided below. Such other techniques may be used to avoid the ripple effect, as desired (which is not always the case).

Generally, the cross-sectional shape of the refractive index profile of the waveguide to be written may be generated using a number of beam scanning methodologies described below, each of which is designed to write a desired refractive index profile. Within cross-sectional shaping, the scanning methodologies or painting techniques may be used to address both global and local shaping requirements. Global shaping is needed to match the waveguides to the operating wavelength of the waveguide device. For example, waveguides operating in the TIR band have larger or wider cross-sections than waveguides designed for the visible. Local shaping may be used to impart customized functionality to a section of the optical devices. While most photolithographic manufacturing processes can shape waveguides in two dimensions, the disclosed techniques are capable of providing full three-dimensional shaping capability.

By locating several elliptical affected regions very close to each other, one can create a "super-waveguide" with a square or rectilinear cross section. In one embodiment, ten to 15 "stripes" may be "painted" to form a good waveguide (e.g., for operation in the 1550-nm TIR window). The process steps and focusing setup showing the fabrication of the square waveguide can be seen in the text of U.S. Provisional Application Ser. No. 60/414,765, the subject matter of which is hereby incorporated by reference in its entirety. See also the cross-sectional refractive index profiles of the widened affected regions of the waveguides 200 and 202 shown in FIGS. 2A and 2B.

Using the disclosed painting techniques, one can control the cross-sectional profile at the global and local level. At the global level, such techniques provide a way to fabricate waveguides with cross-sections optimized for single-mode propagation. Without the painting approach, one may be limited to manufacturing waveguides with elliptical cross-sections. Elliptical waveguides are plagued with large polarization-dependent losses and, in particular, not suitable for signals transmitted in telecommunication applications. In addition, elliptical waveguides tend to be multimode along one axis and single mode along the others, which is unacceptable in many applications. With the implementation of a painting-based process, such problems are addressed and testing has shown substantially decreased losses for signals propagating in the TIR window centered at 1550 nm and significantly reduced polarization dependence.

At the local level, painting techniques may be used to reduce mode-matching loss resulting from mismatch between the device (waveguide) cross-section and the cross section of the fiber(s) or other optical devices forming the input/output or other interfaces with the external world. To address such losses and other issues, spatial tapering via the painting process may be used.

Figure 3:
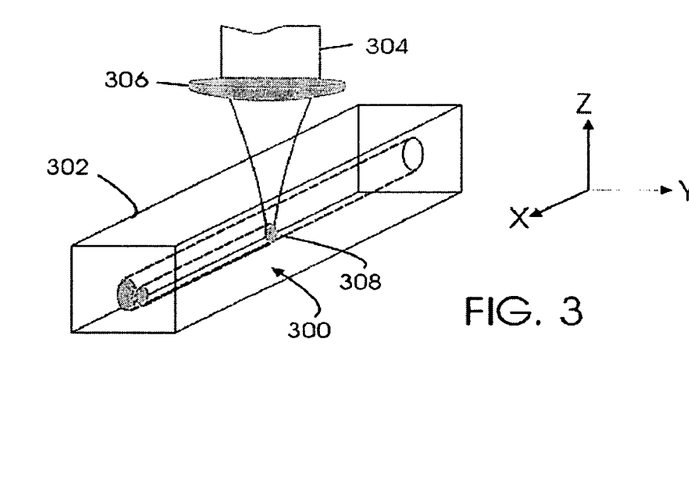
FIG. 3 is an illustration of an ultra-short pulse laser beam focused within an optical medium in accordance with one or more of the waveguide fabrication techniques disclosed herein.

FIG. 3 shows the skip-and-scan method of fabricating a waveguide indicated generally at 300 existing in the bulk of an optical substrate 302. Alternatively, the waveguide 300 could be part of a waveguide device such as an AWG, Mach Zehnder Interleaver, or another type of waveguide structure such as an optical fiber. While the substrate 302 is shown as a single structure, it could alternatively be made of multiple substrates sandwiched together to house the waveguide 300. The substrate 302 may be made of any material that is transparent or substantially transparent at the writing wavelength (e.g., 800 nm), and the wavelength of interest for signals of the application (e.g., a TIR wavelength). Some examples would include any optical glass, fused silica, and other optoelectronic materials, such as Lithium niobate.

To fabricate the waveguide 300 in accordance with the embodiment shown in FIG. 3, a beam of ultra-short pulses of light 304 is focused by a lens 306 into the substrate 302, or more specifically in the substrate 302 at a position coinciding with a portion of the waveguide 300. In this embodiment, the shape of the waveguide 300, which eventually could be, for example, square, rectangular, elliptical or circular in cross-section, will be established via multiple scans of the light pulse beam 304. For any one given scan, the spatial profile of the beam 304 has a Gaussian $TEM_{00}$ intensity profile and is focused by the lens 306 to a Gaussian beam waist (not shown). As described in the above-identified application, the focused beam 304 of ultrashort pulses induces a modified index of refraction profile over an ellipsoidal affected volume or region 308. This affected region 308 eventually constitutes a portion of the waveguide 300 as the ultrashort laser pulse focus is moved in relative fashion along the waveguide propagation axis (shown as the x-axis in FIG. 3). Another portion of the waveguide 300 that has already been written is also shown in FIG. 3 and is adjacent to the portion including the affected region 308.

Figure 4:
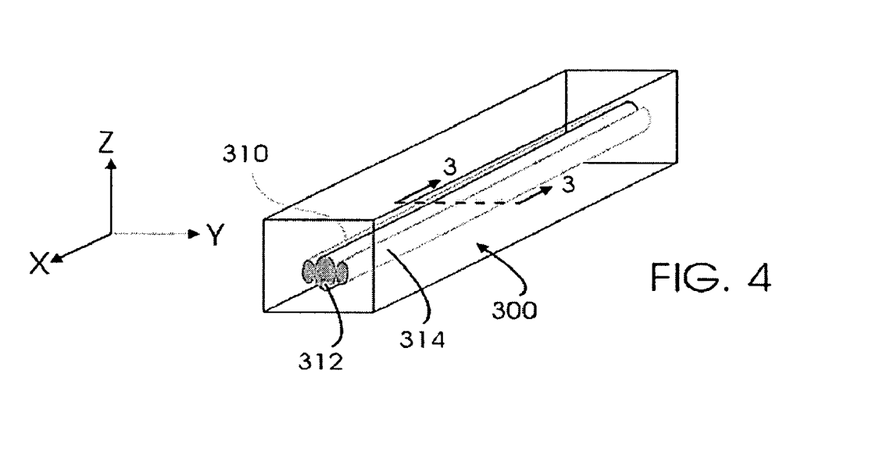
FIG. 4 is an illustration of multiple affected regions formed within an optical medium using one or more of the waveguide fabrication techniques disclosed herein.
Figure 5:
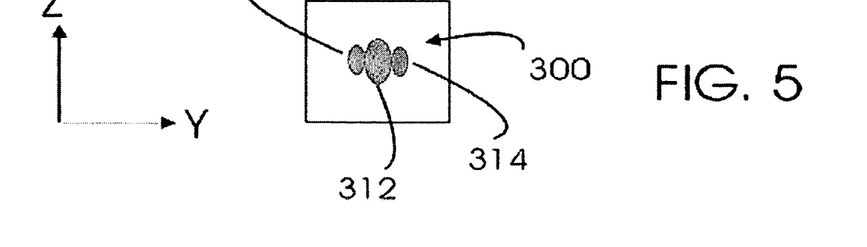
FIG. 5 is a cross-sectional illustration taken along line 3-3 of FIG. 4 of the waveguide profile formed via one or more of the waveguide fabrication techniques disclosed herein.

The embodiment shown in FIGS. 3-5 may be referred to as a "skip-and-scan" approach because one portion of the waveguide 300 is written and then the ultrashort laser pulse focus is then skipped to a new position in a direction other than the waveguide propagation axis. This direction may be, for example, a lateral or vertical direction-(shown in FIG. 3 as the y-axis and z-axis, respectively), or any other direction that will result in the writing of a path that will become part of the widened affected region.

So, in a simple embodiment, if the laser beam is directed along the z-axis, and the waveguide is being written along the x-axis (such that the waveguide propagation axis is said to be the x-axis), then after writing a first pass (as shown in FIG. 3), the laser pulse focus may be moved a certain distance along the y-axis before starting the second pass, and so on. The incremental change along the y-axis may be small enough such that the resulting two adjacent affected regions overlap. The incremental change may alternatively proceed such that two adjacent affected regions are not written consecutively.

For example, the focus of the beam or the sample is scanned in a path one or more times along the waveguide propagation axis, then the focus is moved a selected distance transversely to this axis. If adjacent paths are to be written, the selected distance may be, for example, 0.5 microns or 1.0 microns in center-to-center path distance. If adjacent paths are not to be written sequentially, then the selected distance may include some added distance to alternate the path writing sequence.

This method of moving the laser pulse focus in a direction other than the waveguide propagation axis may be continuous or discontinuous. That is, while the focus is skipped, or moved to the new position, the laser pulse beam may continue writing (continuous) or may cease writing (discontinuous). If the laser pulse focus is moved back to a starting point of the waveguide for each path, such that the affected region always moves along the waveguide propagation axis in the same direction, then discontinuous skip-and-scan may be used. Conversely, if the laser pulse focus is moved along the waveguide propagation axis in both directions, then continuous skip-and-scan may be used.

The scanning path of the manufacturing laser beam may be repositioned through discrete lateral (or other) stepping through the use of mechanical stages. In contrast, other embodiments to be described below (e.g., acousto-optic-based or rasterized scanning) may involve continuous repositioning.

The skip-and-scan approach may be implemented in several ways. In one embodiment, the beam may scan a region or line repetitively before moving to another region or line. However, this approach should not be limited to a procedure in which the beam scans a region or line repetitively before being moved laterally. Alternatively, a region or line is scanned, one or more other regions or lines is scanned, and the process is repeated.

For example, one embodiment may include about seven passes to generate an effective square profile, and as many as 10-15 or more passes for other profiles. Such profiles may be scanned incrementally, in the sense that the same region is scanned a number of times (e.g., four) with each repetition for a given path producing an incremental modification of the refractive index in the affected region. But after each incremental modification, the laser pulse focus is skipped to the next path, such that the refractive index profile takes shape incrementally across the profile (as opposed to the writing of a complete index change along one path, followed by a complete index change along a second path, etc.). This process will help obtain refractive index uniformity across the cross-sectional profile of the widened affected region.

Different regions or lines may warrant a different number of scans, depending on the location of the region or line within the waveguide cross-section. Increased scanning for interior lines and less scanning near the edges may present advantages for waveguide shaping and waveguide functionality. Such changes in the process may be accomplished by changing the scanning speed, or speed at which the relative movement of the laser pulse focus along the waveguide propagation axis. Other performance advantages may be provided by changing the order or direction of scanning. For example, one can start from left of the cross-sectional profile and move to the right, or vice versa, or perhaps start in the center and alternate between left and right.

Skip-and-scan approaches may also involve skipping one or more lines or paths. Such approaches may be designed to produce the ripple effect and/or introduce controlled polarization dependence to fabricate, for example, a polarizer or a grating.

It should also be noted that the laser power level may be changed for different lines. Examples of such power modulation include modulating the power to fabricate round cross-sectional profiles through edge attenuation. Further, power modulation may be used to create double-lobe cross-sections or other shapes to favor certain modes, such as TEM 01. Power modulation may also be used to avoid generating corners that may become a source of a micro-crack in the medium or substrate. Avoiding the generation of corners also may help prevent stresses and stress-birefringence problems. Similarly, each line may be scanned at an equal or different scanning speed.

Set forth below are just a few of the possible combinations of alternative techniques specified above:

(i) Scanning multiple lines while keeping the pulse energy constant and with same number of passes per line, all of which written at the same scanning speed;

(ii) Scanning multiple lines with a change in the pulse energy to obtain a predetermined profile, such as Gaussian-like profile shape, where the line in the middle is scanned with the highest energy to obtain the largest index change, the lines adjacent to the center line have a smaller energy applied thereto, and the energy is reduced for the next pair of lines, and so on to the exterior of the profile; and, (iii) Scanning multiple lines while keeping the pulse energy constant but with a differing number of passes to obtain the predetermined profile (or via changing the writing speed).

With reference to FIGS. 4 and 5, the waveguide 300 fabricated via the skip-and-scan approach includes multiple adjacent waveguide portions 310, 312, 314 generated via the modification of respective affected regions along the waveguide propagation axis (in FIGS. 4 and 5, the x-axis). As shown, portions of the adjacent portions 310 and 312 are contiguous, as with the adjacent regions 312 and 314. However, the adjacent waveguide portions need not be contiguous, but rather may be positioned in any manner such that the propagation of a fundamental mode of a signal having a TIR wavelength is supported by the widened affected region created by the collection of regions 310, 312, and 314. In contrast, each affected region 310, 312, 314 has a cross-sectional profile incapable of supporting the fundamental mode of that signal having a TIR wavelength. The collective cross-sectional refractive index profile may, but need not, have an effective rectilinear shape, and may, but need not, have a uniform refractive index.

The adjacent regions 310, 312 and 314 may constitute separate and distinct index change profiles, but they also may overlap.

In accordance with an alternative embodiment, the laser beam focus is not scanned in separate paths along the waveguide propagation axis, but rather scanned in a direction other than the waveguide propagation axis while it is scanned along the waveguide propagation axis. This technique will be referred to herein as "raster scanning" but the term "raster" should not be read to limit the technique to a certain pattern. Raster scanning may involve continuous, rapid movement in a repetitive or other pattern designed to move the focus in one or more directions other than the waveguide propagation axis. Such scanning involves rapid movement in the sense that the non-axial pattern may be covered one or more times for each length portion of the waveguide. As the focus is scanned along the waveguide axis to write each such length portion, it may be rastered in a particular direction (or directions) with either a fixed or adjustable raster rate or pattern. The raster pattern may take on a number of forms, and is not limited to horizontal, lateral, or other linear traces.

The sample may be scanned with respect to focus along the waveguide optical axis while the sample or beam is simultaneously dithered or rastered along a direction that is of a particular orientation to the scanning direction. This orientation may remain fixed or be varied relative to the scanning direction as the prescribed waveguide propagation axis may also vary in direction. Alternatively, a rotating beam may be used. In this case the beam is rotated in a small circle with a desired diameter. This circle is perpendicular to the writing; beam propagation path. The waveguide is traced along one path. Here the painting is achieved with the rotating beam. The beam rotation rate may be fast relative to the waveguide scanning speed. Alternatively, the sample may be rotated or otherwise moved.

In general, raster scanning-based embodiments of the disclosed method address the strong, very localized modulation (e.g., ripples) that may be created between the various stripes that form painted waveguides. Modifications of standard processing parameters (for skip-and-scan) have been shown to reduce this effect. Reducing spacing between scan passes reduces modulation, and scanning in one direction with a retrace in the opposite direction at a 0.25 micron spacing from the first pass has been shown to smooth the profile. However, tests have also shown that lateral raster-scanning provides a very smooth index profile solution. A smoother index profile should help reduce scattering loss, especially at shorter wavelengths. The high frequency index modulation of the ripples may also be a source of scattering loss and create a polarization dependent component to the scattering loss (of the order of 0.1 dB/cm at 1550-nm). It should be noted that the lateral raster scanning may be combined, where possible (e.g., no significant bends in the waveguide propagation axis) with longitudinal raster scanning for further smoothing and painting of the waveguide.

Raster scans may include a speed, power or other laser parameter adjustment as the laser beam focus is moved in the direction other than the waveguide propagation axis. Speeding up the scan rate when the focus nears a waveguide profile edge, for instance, will help-maintain-a uniform refractive index profile. Otherwise, writing in the regions near such edges would be undesirably enhanced as compared with the center portions of the waveguide. Adjusting the laser parameters can be used to obtain any predetermined cross-sectional profile of the widened affected region.

Raster scanning may further include adjusting the raster scanning direction to accommodate bends or turns in the waveguide, i.e., curves in the waveguide propagation axis. Such adjustments may include adjusting the direction in which raster scan occurs. For example, a lateral raster scan would need to be adjusted to remain perpendicular to the waveguide propagation axis.

Raster scanning may be accomplished using mechanically and non-mechanically driven movement. While mechanical stages may be driven at rates quick enough for raster scanning, any number of non-mechanical schemes may be employed, the only qualification being the ability to adequately control the direction of the laser pulse beam in space and in time. Non-mechanical schemes known to those skilled in the art for laser direction include the use of a galvanometer to move the mirrors relied upon for laser beam control. A galvanometer may be used alone or in conjunction with other raster scan techniques.

Another non-mechanical approach to raster scanning would include an implementation system having acousto-optic deflectors. While the foregoing embodiments of the painting process may be implemented solely through mechanical translation stages, these stages may impose several limitations under certain operational conditions. The accuracy of such stages may be limited, and the stages cannot rapidly reverse direction. The stages may also introduce vibration when driven at high speed. Such restrictions are avoided through the use of acousto-optical deflectors, either alone or in combination with mechanical stages as appropriate.

In addition to their primary pointing or deflection function, acousto-optic deflectors may also be used to control the amplitude of the incoming manufacturing laser beam. One can thus vary the laser intensity during the raster scanning motion in order to create a more complex refractive index cross-sectional profile. For example, one may create round cross-sections instead of a square cross-section. Avoiding or reducing corners may decrease or eliminate some polarization dependence effects.

An acousto-optic deflector may also be used to split the incoming manufacturing laser beam in multiple beamlets and control those independently. This approach may be used to speed up the overall manufacturing process.

In summary, acousto-optic deflection techniques may provide continuous deflection control, deflection and amplitude control, and/or control techniques for multi-beam (or beamlets). In these ways, the acousto-optic embodiments of the disclosed method provide the capability to fabricate waveguides that have, among other aspects, both smooth index profiles (to avoid strong localized modulation between the painting stripes) and round or other non-corner shaped index profiles (through, e.g., amplitude control), as well as the capability to paint with multiple beams.

Yet another embodiment of the disclosed painting approach involves the use of multiple beams either alone or in conjunction with one or more of the above-specified embodiments. In one embodiment, the foci of the multiple beams are arranged with specified separations and scanned along the prescribed waveguide axis. This embodiment effectively realizes a multiplexed skip-and-scan implementation. Alternatively, the individual beam foci can be rastered in specified pattern in conjunction with the selective removal or introduction of different beams realizing a hybrid "painting" of multiplex skip-and-scan and rastering.

Set forth below is another exemplary application of the above-described painting technique, one in which the fabrication methods are applied to address and/or augment polarization dependence.

Optical devices should introduce as little loss as possible and must show well-controlled polarization dependence. Optical devices are designed to either show no polarization dependence (as for most components used in telecommunications) or to show a strong polarization dependence (as for some highly accurate sensors such as optical gyroscopes). A manufacturing platform may provide either type of functionality.

Unwanted polarization dependence affects many optical parameters, including all types of loss, coupling and splitting ratios at various junctions, and dispersion (i.e., propagation speed in an optical device is function of the signal polarization).

Waveguides produced with an ultrashort laser may exhibit some polarization dependence. For example, tests have shown a slight loss difference (0.1 dB/cm) between P-polarization and S-polarization for painted waveguides fabricated using a skip-and-scan approach. This effect, called PDL in the telecommunications field, may be eliminated through a lateral raster scanning painting process to produce smoother index profiles with less anisotropic modulation, together with significant reductions in PDL.

In connection with couplers and/or splitters, stress birefringence between waveguides may create polarization-dependence. To reduce the polarization dependence of couplers and splitters, one may replace the square cross-sections with waveguides having round cross-sections in order to eliminate stress birefringence at the corners. Alternative designs include where the energy is transferred vertically from one waveguide to the other. Experimental data has shown that there is less stress birefringence in that direction.

The converse of the foregoing approaches may be used to create strong polarization dependence, or controlled polarization dependence. Such approaches may be useful in connection with, for example, polarizers used in numerous sensors to avoid sensitivity degradation due to polarization beating. The converse of the foregoing approaches may further be used to create strong stress birefringence in order to exacerbate polarization dependence.

The polarization of the ultrashort laser beam may also be important to the fabrication of waveguide devices having good transmission and other performance characteristics. Under certain circumstances, the process of painting a waveguide, as described in accordance with the embodiments disclosed herein, results in the generation of unwanted cracks. These cracks can introduce severe optical losses and other unwanted effects. To reduce the occasional formation of cracks, and/or to mitigate the effects of the cracks, the polarization of the ultrashort laser beam is controlled. More particularly, the polarization may be controlled such that it remains fixed in the direction of the waveguide propagation axis (thereby necessitating adjustments thereto for waveguide bends). Alternatively, the polarization may be adjusted during scanning such that it is either continuously or occasionally modified.

Generally speaking, scanning with the ultrashort laser beam polarization perpendicular to the waveguide propagation axis has been found to result in severe crack formation. These cracks predominately run along the waveguide propagation axis and can be of sufficient size and extent to drastically reduce the waveguide light throughput. To avoid such cracks, the stresses applied to the substrate by the painting process would otherwise need to be limited, thereby posing a functional limit to the possible amount of index change (waveguide numerical aperture) provided by direct-write techniques. The cracks are often limited to one edge of the waveguide, but they could also run from one edge of the waveguides to the opposite edge. A typical crack is typically longer than 50 microns long.

On the other hand, when the laser polarization is parallel to the waveguide propagation axis, the cracks are much less frequent and, when they do appear, they run perpendicular to the waveguide axis terminating at the edge of the waveguide. This naturally makes the cracks short, and they do not affect the waveguide transmission as severely as in the former case.

In fact, the orientation of the crack has been found to be more dependent on the polarization orientation than on the waveguide axis. That is the crack orientation or line along which material separation occurs is perpendicular to the polarization axis. For example, a crack was produced when the laser polarization was set at 45 degrees to the waveguide axis.

In light of the sizes, severity, and frequency of occurrence of the cracks associated with painting, another embodiment of the disclosed embodiment includes a dynamic adjustment (i.e., adjustment during scanning) or control of the polarization of the laser such that it is always parallel to the scanning direction, or waveguide propagation axis, regardless whether the waveguide is straight or curved.

One way in which the polarization of the writing beam can be controlled would be to insure that it remains parallel to the waveguide propagation axis. The polarization of the writing beam may therefore be adjusted as a waveguide is written in order to have the polarization vector always pointing along the axis of the waveguide. To that end, the polarization of the writing beam may be rotated to point in the desired direction using a half-wave plate or other polarization-adjustment mechanism well known to those skilled in the art. Such rotation of the half-wave plate may be controlled by the same hardware and software that control the XYZ stages that translate the device being manufactured.

In accordance with an alternative embodiment, the polarization may be rotated at a fast speed relative to the scanning speed such that each point along the waveguide effectively encounters a sweep of a significant number of polarization directions. In such a case, the ultrashort laser beam is said to be depolarized.

One way in which one can determine whether a waveguide is capable of supporting a signal of a certain wavelength, and/or otherwise characterize the waveguiding property of a region would be to evaluate the ability of the region to capture an incoming signal and confine the signal throughout the extent of the region. Generally speaking, this determination should include analysis involving a bend of not insignificant curvature. Alternatively, or in addition, one may look to the calculated v-number of the waveguide, as is known to those skilled in the art, and whether it falls within a range bounded generally by the minimum v-number necessary for guiding any light at a certain wavelength and by the maximum v-number for single-mode propagation at that wavelength.

For example, one quantitative way to classify whether a waveguide is capable of supporting a certain optical signal would be to determine whether the signal is transmitted through a 90-degree bend or turn having a 1.5-cm radius of curvature with excess losses less than or equal to about 10%, where excess losses exclude all losses except those specifically due to bending. Under this classification methodology, the affected region 100 shown in FIG. 1, the affected region 308 of FIG. 3, and the waveguide portions 310, 312, and 314 of FIGS. 4 and 5 are incapable of supporting the fundamental mode of a signal having a TIR wavelength.

Other ways of such classification would involve comparisons with the performance of a single-mode telecommunications fiber. So, in terms of bending losses, performance of the waveguide at similar levels as the fiber would qualify as supporting the optical signal in question.

Generally speaking, the above-described embodiments address the movement of the laser beam(s) focus or resulting voxel. The embodiments should not be limited to any particular set of writing beam parameters, which may be significantly changed in connection with voxel motion. Beam parameters like pulse energy, pulse temporal shape, beam spatial shape, and aberration compensation, among others, are useful in defining the shape of the voxel, and subsequently, the shape of the painted index profile region. Dynamic beam modification may also be useful when the distance between the focus and the substrate surface is changed, especially in connection with writing three-dimensional photonic circuits.

The disclosed fabrication techniques will generally allow for the transverse fabrication of waveguides. Transverse fabrication techniques, in turn, provide the ability to write complex patterns involving curved waveguides and waveguides at different depths. The disclosed techniques also address how to fabricate waveguides that are capable of supporting TIR-wavelength signals despite such complex patterns.

The above described techniques will greatly reduce manufacturing cost and increase manufacturing yields of waveguide structures like AWG and interleavers, or any device that operates on the basis of optical interference.

The techniques may generally be used to tailor the shape of the index of refraction profile of the waveguide to accommodate propagation at a desired wavelength. That is, the techniques provide a way to fabricate waveguides of a certain cross-sectional shape, such as round, so that the waveguide size and shape is closely matched to single-mode fibers transmitting TIR-wavelength signals. And the techniques still further allow control of the polarization dependence of the waveguides. Generally, the above-described painting techniques may be used for creating waveguides of predetermined size and shape in a substrate solely using ultrashort laser pulses to effect refractive index change throughout the waveguide. A pre-existing waveguide is not necessary.

The foregoing are but a few of the ways in which painting techniques and methods through the use of an ultra-short pulse laser beam can improve the fabrication and performance of optical devices. Those of ordinary skill in the relevant art will recognize other beneficial applications of these techniques in improving performance and manufacturing yield of these and other structures. Any of the disclosed techniques could be combined with other disclosed techniques to further improve device operation or manufacturing methods.

We claim:

1. A method of writing a waveguide having a bend, a splitter, or a coupler structure and having a waveguide propagation axis in a substrate, the method comprising the steps of:
   directing an ultrashort laser beam to the substrate in transverse relation to the waveguide propagation axis to generate an ultrashort laser pulse focus in the substrate;
   modifying a refractive index in an affected region in the substrate along the waveguide propagation axis via the ultrashort laser pulse focus;
   adjusting polarization of the ultrashort laser beam during the directing step to maintain the polarization relative to the waveguide propagation axis; and
   moving the ultrashort laser pulse focus in a direction other than the waveguide propagation axis to generate a widened affected region along the waveguide propagation axis;
   wherein—
   the widened affected region has a cross-sectional profile capable of supporting a fundamental mode of a signal having a telecommunications infrared (TIR) wavelength, and
   the affected region has a cross-sectional profile incapable of supporting the fundamental mode of the signal having the TIR wavelength.

2. The method of claim 1 wherein the ultrashort laser pulse beam has a polarization in a direction parallel to the waveguide propagation axis.

3. The method of claim 1 wherein the moving step is performed during performance of the modifying step.

4. The method of claim 3 wherein the moving step comprises Mastering the ultrashort laser pulse focus continuously with movement along the waveguide propagation axis.

5. The method of claim 1 wherein the modifying step comprises scanning a first path along the waveguide propagation axis such that the affected region along the first path comprises a first portion of the waveguide.

6. The method of claim 5 wherein:
   the moving step comprises skipping the laser pulse focus to a new position in the direction other than the waveguide propagation axis; and
   the modifying step further comprises scanning a second path starting from the new position and continuing along the waveguide propagation axis;
   such that the affected region along the second path comprises a second portion of the waveguide.

7. The method of claim 6 wherein the skipping and scanning steps are both repeated such that a total of at least about seven adjacent affected regions are generated and together constitute the widened affected region.

8. The method of claim 7 wherein the cross-sectional profile of the widened affected region has an effective rectilinear shape.

9. The method of claim 7 wherein the scanning steps for adjacent affected regions are not performed sequentially.

10. The method of claim 6 wherein the first and second portions of the waveguide are separated by a center-to-center distance of about 0.5 microns.

11. The method of claim 6 wherein the first and second portions of the waveguide are separated by a center-to-center distance of about 1.0 micron.

12. The method of claim 6 wherein the scanning steps associated with the first and second portions of the waveguide are repeated such that the ultrashort laser pulse focus retraces the first and second portions.

13. The method of claim 12 wherein the scanning steps are repeated about four times and after each repetition of the scanning step for one of the first and second portions of the waveguide that produces an incremental modification of the refractive index in the affected region, the other portion is scanned.

14. The method of claim 6 further comprising the step of adjusting a scanning speed for the scanning of the second path.

15. The method of claim 6 further comprising the step of adjusting the ultrashort laser pulse beam to change a power level for the scanning of the second path.

16. A method of writing a waveguide having a bend, a splitter, or a coupler structure and having a waveguide propagation axis in a substrate, the method comprising the steps of:
   directing an ultrashort laser pulse beam to the substrate in transverse relation to the waveguide propagation axis to generate an ultrashort laser pulse focus in the substrate;
   modifying a refractive index in an affected region in the substrate along the waveguide propagation axis via the ultrashort laser pulse focus; and
   moving the ultrashort laser pulse focus in a direction other than the waveguide propagation axis to generate a widened affected region along the waveguide propagation axis;
   wherein the ultrashort laser pulse beam has a polarization in a direction parallel to the waveguide propagation axis.

17. The method of claim 16 wherein the modifying step comprises adjusting the polarization of the ultrashort laser pulse beam to accommodate a bend in the waveguide propagation axis.

18. The method of claim 16 wherein the modifying step comprises scanning a first path along the waveguide propagation axis such that the affected region comprises a first portion of the waveguide.

19. The method of claim 18 wherein
   the moving step comprises skipping the laser pulse focus in the direction other than the waveguide propagation axis; and
   the modifying step further comprises scanning a second path along the waveguide propagation axis subsequent to the skipping step;
   such that the affected region comprises a second portion of the waveguide.

20. The method of claim 19 wherein the skipping and scanning steps are both repeated such that a total of at least about seven adjacent affected regions are generated and together constitute the widened affected region.

21. The method of claim 20 wherein each respective affected region is incapable of supporting the fundamental mode of the signal having the telecommunications infrared (TIR) wavelength.

22. The method of claim 20 wherein the cross-sectional profile of the widened affected region has an effective rectilinear shape.

23. The method of claim 19 wherein the first and second portions of the waveguide are separated by a center-to-center distance of about 0.5 microns.

24. The method of claim 19 wherein the first and second portions of the waveguide are separated by a center-to-center distance of about 1.0 micron.

25. The method of claim 19 wherein the scanning steps associated with the first and second portions of the waveguide are repeated such that the ultrashort laser pulse focus retraces the first and second portions.

26. The method of claim 19 wherein the scanning steps are repeated about four times and after each repetition of the scanning step for one of the first and second portions of the waveguide that produces an incremental modification of the refractive index in the affected region, the other portion is scanned.

27. The method of claim 16 wherein the moving step is performed during performance of the modifying step.

28. The method of claim 16 wherein the moving step comprises rastering the ultrashort laser pulse focus continuously with movement along the waveguide propagation axis.

29. A method of writing a waveguide having a bend, a splitter, or a coupler structure and having a waveguide propagation axis in a substrate, the method comprising the steps of:

directing an ultrashort laser beam to the substrate in transverse relation to the waveguide propagation axis to generate an ultrashort laser pulse focus in the substrate;

modifying a refractive index in an affected region in the substrate along the waveguide propagation axis via the ultrashort laser pulse focus;

controlling of the ultrashort laser beam during the directing step to maintain a polarization of the ultrashort laser beam relative to the waveguide propagation axis; and moving the ultrashort laser pulse focus in a direction other than the waveguide propagation axis to generate a widened affected region along the waveguide propagation axis.

30. The method of claim 29, wherein the controlling step comprises adjusting the polarization through a bend in the waveguide propagation axis.

31. The method of claim 29, wherein the polarization is in a direction parallel to the waveguide propagation axis.

32. The method of claim 31, wherein the controlling step comprises maintaining the parallel direction of the polarization relative to the propagation axis to accommodate a change in the waveguide propagation axis.

33. The method of claim 29, wherein the controlling step is performed during the moving step.

34. The method of claim 29, wherein the controlling step comprises avoiding a polarization direction perpendicular to the waveguide propagation axis.

* * * * *

UNITED STATES PATENT AND TRADEMARK OFFICE
CERTIFICATE OF CORRECTION

PATENT NO. : 7,294,454 B1  Page 1 of 1
APPLICATION NO. : 10/676972
DATED : November 13, 2007
INVENTOR(S) : Ali Said et al.

It is certified that error appears in the above-identified patent and that said Letters Patent is hereby corrected as shown below:

Column 15
claim 4, line 42, please delete "Mastering" and replace with -- rastering --

Column 18
claim 29, line 4, please delete "of" after "controlling"

Signed and Sealed this

First Day of April, 2008

JON W. DUDAS
*Director of the United States Patent and Trademark Office*